United States Patent
Nam et al.

(10) Patent No.: US 10,269,106 B2
(45) Date of Patent: Apr. 23, 2019

(54) METHOD OF ANALYSING IMAGES OF ROD-LIKE PARTICLES

(71) Applicant: RESEARCH & BUSINESS FOUNDATION SUNGKYUNKWAN UNIVERSITY, Suwon-si (KR)

(72) Inventors: Jaewook Nam, Seoul (KR); Dongjae Kim, Taean-gun (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 384 days.

(21) Appl. No.: 15/349,546

(22) Filed: Nov. 11, 2016

(65) Prior Publication Data

US 2017/0140522 A1   May 18, 2017

(30) Foreign Application Priority Data

Nov. 12, 2015   (KR) .................. 10-2015-0158789

(51) Int. Cl.
    *G06T 5/10*    (2006.01)
    *G06T 7/00*    (2017.01)
    *G06T 7/60*    (2017.01)

(52) U.S. Cl.
CPC ............. *G06T 7/0004* (2013.01); *G06T 5/10* (2013.01); *G06T 7/60* (2013.01); *G06T 2207/10056* (2013.01); *G06T 2207/20024* (2013.01); *G06T 2207/20056* (2013.01); *G06T 2207/30136* (2013.01)

(58) Field of Classification Search
None
See application file for complete search history.

(56) References Cited

U.S. PATENT DOCUMENTS

2004/0179738 A1 * 9/2004 Dai .................. G06T 7/0002
   382/218
2015/0221092 A1 * 8/2015 Mega ................. G06T 7/42
   382/103

FOREIGN PATENT DOCUMENTS

JP    2009-63565 A    3/2009
KR   10-2015-0086297 A    7/2015

OTHER PUBLICATIONS

Korean Office Action dated Nov. 11, 2016 in counterpart Korean Patent Application No. 10-2015-0158789 (4 pages, in Korean).

* cited by examiner

*Primary Examiner* — Chan S Park
*Assistant Examiner* — Elisa M Rice
(74) *Attorney, Agent, or Firm* — NSIP Law

(57) ABSTRACT

There is provided a method for analyzing an image of rod-shaped particles, the method comprising: transforming a spatial domain image of rod-shaped particles having random orientations to a frequency domain image thereof using DFT (discrete Fourier transform); extracting connected components from the frequency domain image using a frequency domain filter, wherein the connected components have a predetermined orientation; and back-transforming the frequency domain image having the extracted connected components to a spatial domain image thereof using IDFT (inverse discrete Fourier transform).

8 Claims, 6 Drawing Sheets

METHOD OF ANALYSING IMAGES OF ROD-LIKE PARTICLES

CROSS-REFERENCE TO RELATED APPLICATION

This application claims the benefit of Korea patent application No. 10-2015-0158789 filed on Nov. 12, 2015, the entire content of which is incorporated herein by reference for all purposes as if fully set forth herein.

BACKGROUND

Field of the Present Disclosure

The present disclosure relates to a method for analyzing an image of rod-shaped particles, and, more particularly, a method for analyzing an orientation distribution, length distribution and/or area fraction of rod-shaped particles from a black-white image of a network of the rod-shaped particles.

Discussion of Related Art

Recently, metal nano-wires have attracted attention as a next generation flexible transparent electrode. The performance of the transparent electrode film is determined from the network of nano-wires. For understanding the structure (connectivity, wire versus area ratio, orientation distribution, etc.), an image of the microscopic inner configuration of the nano-wires taken using films should be checked.

Multifunctional films (for example, transparent electrodes, molecular sieve membranes, etc.) made of nano-materials in material engineering or processes can be described in terms of electrical, optical and mechanical macroscopic properties. Although appropriate equipment (four-point probes, UV spectrometers, and uniaxial tensile testing machines) are used to locate such macroscopic properties, in fact, such macroscopic properties are closely related to the internal microscopic networks of the multifunctional films. Particularly, in networks composed of rod-shaped particles, the diameter, length distribution, number density, orientation, and connectivity of the rod-shaped particles are involved in these macroscopic properties. Therefore, measuring these microscopic properties can provide highly valuable information that allow the engineers to coordinate the networks to meet requirements for the desired physical, chemical, or electrical film.

Measuring these properties is especially important in the field of silver nano-wire transparent electrodes. In this connection, electrical properties are related to the percolation path of the current (related to the number and aspect ratio of the nano-wires). The optical properties are closely related to an area fraction referring to a ratio between a total area of a substrate and an area of the rod-shaped particles. To determine these microscopic characteristics, a high magnification image taken with a scanning electron microscope (SEM) or a transmission electron microscope (TEM) should be used for the analysis. In this connection, using appropriate image analysis techniques, we will be able to understand the opto-electric properties of the mass-produced films in relation to their process conditions. For example, in dip coating, the speed of the substrate can control the number density of the nano-wires within the film, which affects the overall electrical properties of the film. Therefore, image analysis can be used to gather the information needed to design new process conditions or to design optimal process conditions to control microscopic structures within the film.

Recently, image analysis has been used as a major tool in many engineering fields. Many image analysis measurement techniques, such as transformation with watershed filtering, and Hough transform for circle, etc. have been proposed to detect circular particles. However, the technique of finding rod-shaped particles is rare. In this connection, a Hough transform is known as a method of finding rod or line-shaped particles, but it is very sensitive to parameter changes. In other words, this is not suitable for automated search of rod-shaped particles in complex networks because of the user's involvement. Another recently reported papers proposed a method for finding the orientation of various rod-shaped particles, but it was not a technique for analyzing the characteristics of individual rod-shaped particles.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

In the present disclosure, the inventors propose a method for quantifying the microscopic network structure of a metal nano-wire-based transparent electrode. FIG. 1 shows some metal nano-wires. In this connection, it can be considered that the metal nano-wires are made of rod-shaped particles having nearly homogeneous thickness, but whose lengths have a certain distribution. In this connection, the length distribution can be drastically changed depending on the nano-wire manufacturing method and the dispersing method of the wires. Further, the number and orientation of the nano-wires in the film can be changed depending on the process condition or the process.

To check these microscopic characteristics, individual nano-wires must be recognized. Because of the large variety of sizes and number of nano-materials, it is almost impossible to manually find and analyze the individual nano-wires. Therefore, automated methods are inevitable. But this is not an easy task. This is because an image refers to a dimension reduction of the three-dimensional structure to a two-dimensional structure, and, further, gray based information (information from 0 to 255) or color based information (RGB information from 0 to 255) are discarded due to the image division, and, rather, the target is separated from a background using a white-black based image (0 and 1), resulting in loss of information. Furthermore, because the particles overlap and cross each other, it makes analysis difficult.

From the consideration of the above, the present disclosure is provide a simple and intuitive method for detecting rod-shaped particles based on filtering on a binary image (a white-black based image (0 and 1)) as a frequency domain image.

The present disclosure is to provide a method for analyzing an image of rod-shaped particles, and, more particularly, a method for analyzing an orientation distribution, number distribution, length distribution, density, and/or area fraction of rod-shaped particles from a black-white image of a network of the rod-shaped particles. For example, the present disclosure is to provide a method for analyzing an enlarged image of rod-shaped particles in silver-nano wires.

In one aspect of the present disclosure, there is provided a method for analyzing an image of rod-shaped particles, the method comprising: transforming a spatial domain image of rod-shaped particles having random orientations to a frequency domain image thereof using DFT (discrete Fourier transform); extracting connected components from the frequency domain image using a frequency domain filter, wherein the connected components have a predetermined orientation; and back-transforming the frequency domain image having the extracted connected components to a spatial domain image thereof using IDFT (inverse discrete Fourier transform).

In one implementation, in the frequency domain image, a DC frequency (0 Hz) is located at a center of a Fourier spectrum, wherein the connected components correspond to comb-shaped diversions diverging radially from the center of the Fourier spectrum in the predetermined orientation, wherein the predetermined orientation is substantially perpendicular to an orientation of the rod-shaped particles in the spatial domain image.

In one implementation, the frequency domain filter is configured to allow the comb-shaped diversions to be passed and to disallow the center of the Fourier spectrum and remaining portions of the frequency domain image to be passed, wherein the remaining portions exclude the comb-shaped diversion, wherein the frequency domain filter include a Gaussian/notch pass filter.

In one implementation, a size of a cutoff frequency for filtering the center is 3% to 10% of a larger length among longitudinal and transverse lengths of the spatial domain image.

In one implementation, the spatial domain image resulting from the back-transforming indicates only the rod-shaped particles having an orientation substantially perpendicular to the predetermined orientation, wherein the frequency domain filter has the predetermined orientation.

In one implementation, the method further comprises counting a number of the rod-shaped particles using the spatial domain image resulting from the back-transforming.

In one implementation, the method further comprises determining an orientation distribution of the rod-shaped particles based on the counted number of the rod-shaped particles.

In one implementation, the method further comprises determining lengths of the rod-shaped particles using the spatial domain image resulting from the back-transforming.

In one implementation, the method further comprises determining a length distribution or area fraction of the rod-shaped particles based on the determined lengths of the rod-shaped particles.

In accordance with the present disclosure, the algorithm is intuitive and is easily extendable in applications thereof. The characteristics of individual rod-shaped particles are measured with less user intervention. The present method uses a specially designed frequency domain filter to locate connected components oriented in a specific direction. The present disclosure provides a new algorithm for detecting rod-shaped particles from the frequency domain image as a black and white image of a network of rod-shaped particles using a Gaussian/notch pass filter.

The microscopic nano-wire network properties (orientation distribution, number distribution, length distribution, density, and/or area fraction) resulting from the analysis by the method of the present disclosure can be used to analyze the opto-electric performance of transparent electrodes.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

Figure 1:
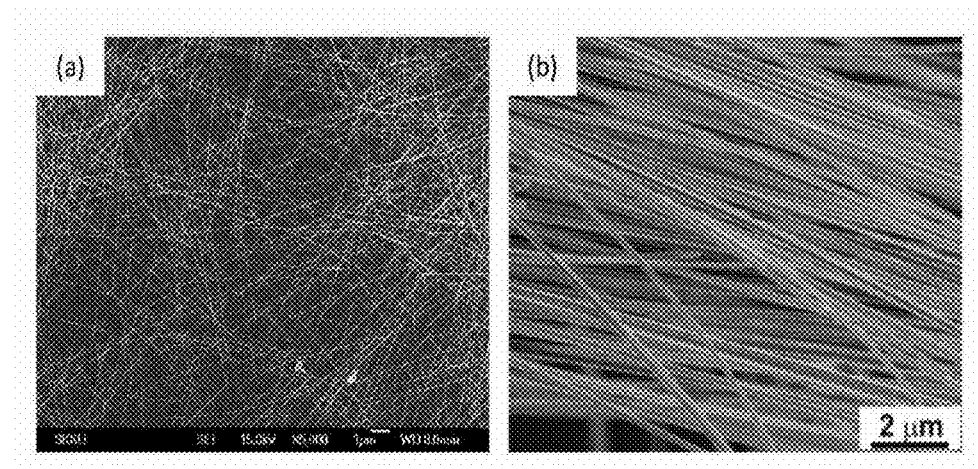
FIG. 1 illustrates a network structure of metal nano-wires.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

DETAILED DESCRIPTIONS

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, s, operations, elements, and/or components, but do not preclude the presence or addition of one or more other features, integers, s, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure."

FIG. 1 illustrates a network structure of metal nano-wires. Referring to FIG. 1, at (a), an image of rod-shaped particles having random orientations is shown. Such rod-shaped particles having random orientations may form a network. Referring to FIG. 1, at (b), an enlarge image of rod-shaped particles having random orientations is shown.

Figure 2:
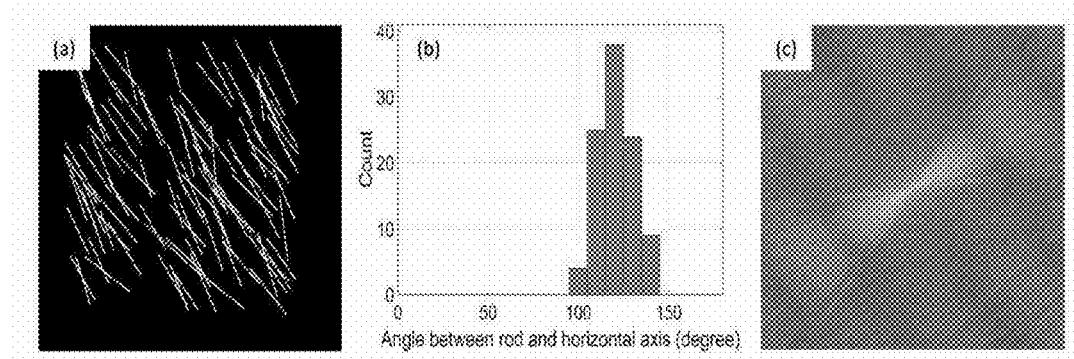
FIG. 2 illustrates a spatial domain image of rod-shaped particles, an orientation histogram thereof and a frequency domain image thereof.

FIG. 2 illustrates a spatial domain image of rod-shaped particles, an orientation histogram thereof and a frequency domain image thereof. FIG. 2, at (a), shows an artificial spatial domain image of a network of rod-shaped particles. Using DFT (discrete Fourier transform), the spatial domain image of the rod-shaped particles having random orientations may be transformed to a frequency domain image thereof. FIG. 2, at (c), shows a frequency domain image transformed from the spatial domain image as shown in FIG. 2, at (a). FIG. 2, at (b), shows a pre-defined orientation distribution of the rod-shaped particles. The frequency domain image includes an image of comb-shaped diversions diverging radially from the center of the Fourier spectrum in the predetermined orientation substantially perpendicular to the orientation of the rod-shaped particles in the spatial domain image. In the frequency domain image, a DC frequency (0 Hz) is located at a center of a Fourier spectrum. Connected components may be extracted from the frequency domain image using a frequency domain filter, wherein the connected components have a predetermined orientation. The connected components correspond to the comb-shaped diversions diverging radially from the center of the Fourier spectrum in the predetermined orientation, wherein the predetermined orientation is substantially perpendicular to an orientation of the rod-shaped particles in the spatial domain image. The Fourier spectrum may be size-exaggerated to $1+\log|Fp|$.

As used herein, the phrase "extracting connected components having a predetermined orientation" may refer to obtain an image of comb-shaped diversions diverging radially from the center of the Fourier spectrum in the predetermined orientation substantially perpendicular to the orientation of the rod-shaped particles in the spatial domain image.

Figure 4:
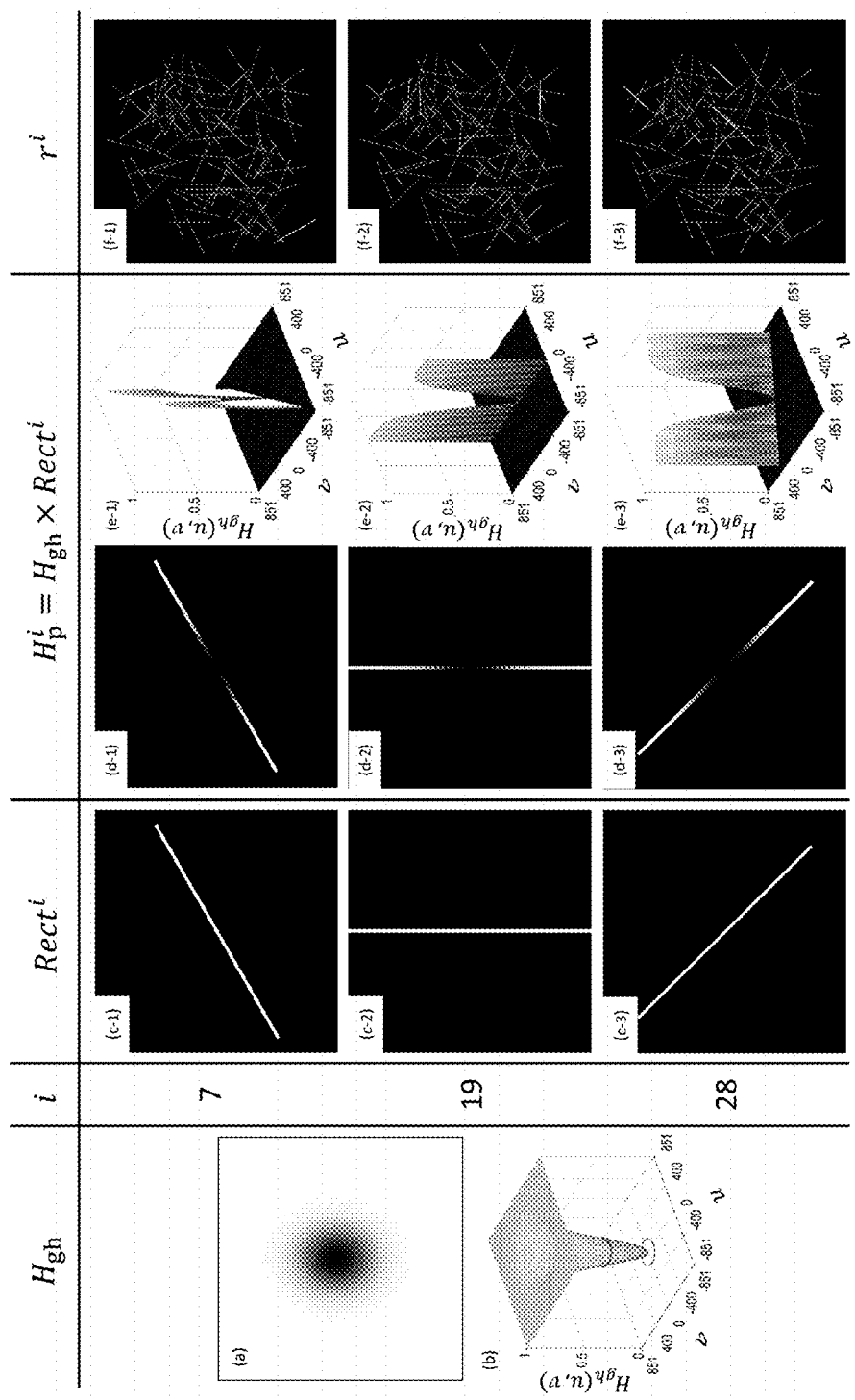
FIG. 4 illustrates a Gaussian/notch pass filter and filtering results performed thereby.

The frequency domain filter is configured to allow the comb-shaped diversions to be passed and to disallow the center of the Fourier spectrum and remaining portions of the frequency domain image to be passed, wherein the remaining portions exclude the comb-shaped diversions, wherein the frequency domain filter include a Gaussian/notch pass filter. Thus, the comb-shaped diversions may be rendered as white, while the center of the Fourier spectrum and the remaining portions may be rendered as black. This filtering may be carried out by the Gaussian/notch pass filter. FIG. 4, at (d), indicates respective Gaussian/notch pass filters.

In accordance with the present disclosure, in order to analyze a network of rod-shaped particles and find out information about the network, a spatial domain image is transformed to a frequency domain image. FIG. 2, at (a), shows an artificial spatial domain image of a network of 100 rod-shaped particles, wherein an orientation and length thereof have normal distributions of $120\pm10°$ (average$\pm$standard variance) and $150\pm20$ pixels. Thicknesses thereof are homogenized using a 3 by 3 morphological dilation filter. FIG. 2, at (b), shows a pre-defined orientation distribution of the rod-shaped particles. FIG. 2, at (c), shows a frequency domain image transformed from the spatial domain image as shown in FIG. 2, at (a). The frequency domain image includes an image of comb-shaped diversions diverging radially from the center of the Fourier spectrum in the predetermined orientation substantially perpendicular to the orientation of the rod-shaped particles in the spatial domain image. Thus, generally, using a specifically designed frequency domain filter, the rod-shaped particles having an overall orientation in a certain range may be detected.

Figure 3:
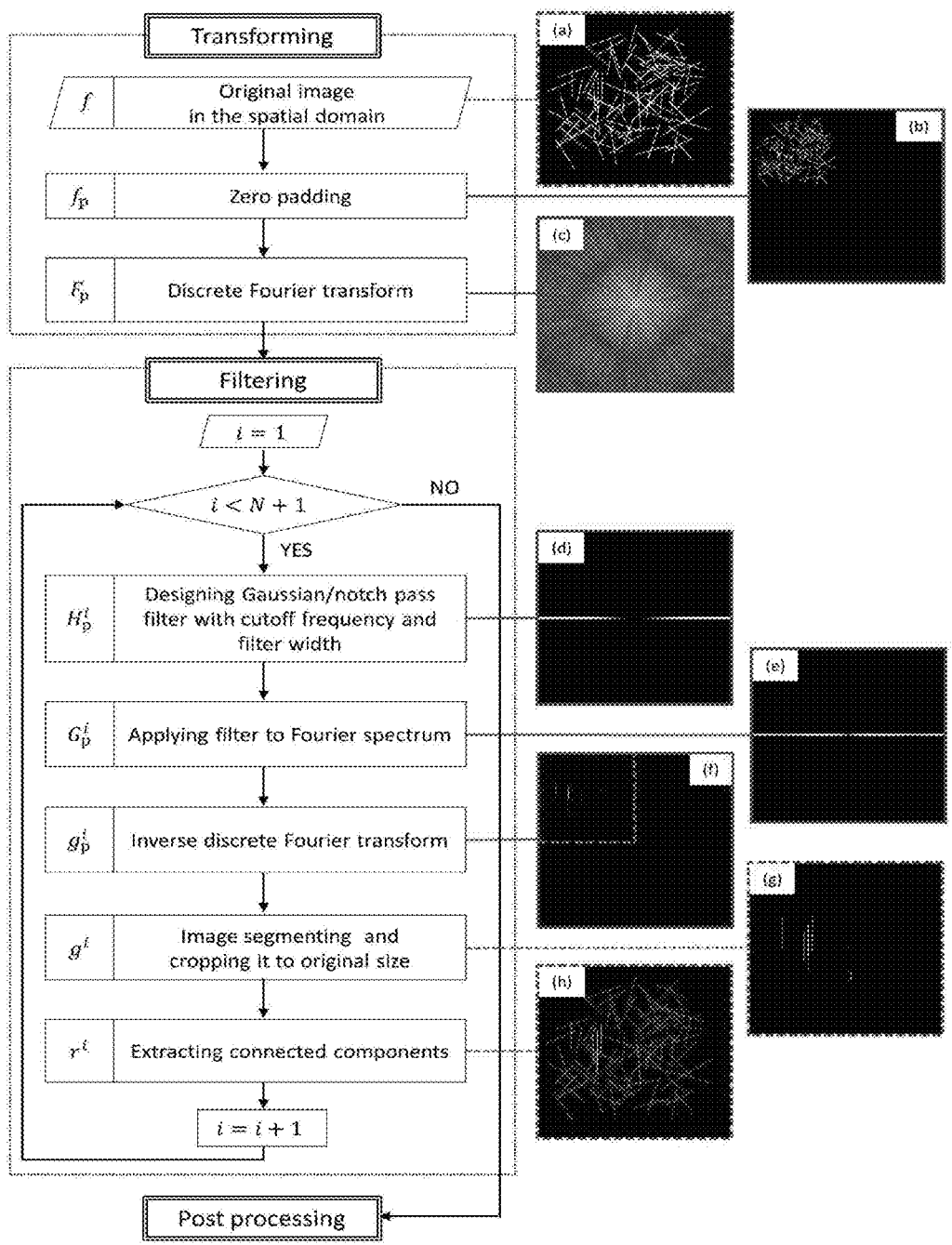
FIG. 3 illustrates a flow chart of a method for analyzing rod-shaped particles in accordance with the present disclosure.

FIG. 3 shows a flow chart of a method for analyzing rod-shaped particles in accordance with one embodiment of the present disclosure. The method will be descried in detail below.

Transforming

A spatial domain image of a network of rod-shaped particles may be transformed via a DFT (discrete Fourier transform) to a frequency domain image thereof. Then, the frequency domain image may be back-transformed to a spatial domain image using IDFT (inverse discrete Fourier transform). In this connection, a zero padding may be applied to suppress a wrap-around error of the DFT.

FIG. 3, at (a), shows a spatial domain image (f) of a network of 100 rod-shaped particles having random orientations. The lengths of the rod-shaped particles may have a normal distribution of 150±20 pixels. The thicknesses thereof may be homogenized using a 3 by 3 morphological dilation mask. FIG. 3, at (b), shows a zero-padded image (fp). FIG. 3, at (c), shows a frequency domain image or Fourier spectrum (Fp) resulting from DFT (discrete Fourier transform) of the zero-padded image. In this connection, zeros may padded to allow the spatial domain image to be doubled as shown in FIG. 3, at (b). Since the original spatial domain image has the random orientations, the frequency domain image (Fp) has comb-shaped diversions diverging radially from the center of the Fourier spectrum. In this connection, a DC frequency (0 Hz) of the Fourier spectrum may be shifted to a center thereof. The Fourier spectrum may be size-exaggerated to $1+\log|Fp|$. Due to the shift and size-exaggeration, the Fourier spectrum may be configured such that a frequency thereof gradually increases from the center thereof radially. Further, a brightness of the Fourier spectrum may represent a relative magnitude thereof. In the frequency domain image, a low frequency may relate to an overall silhouette of the image, while a high frequency may relate to a location with a rapid brightness change or a noise.

Filtering

In the spatial domain, a 2D filtering may be implemented using 2D circular convolution and may be expressed by a following equation (1):

$$f(x, y) \circledast h_a(x, y) = \sum_{\alpha=0}^{a-1} \sum_{\beta=0}^{b-1} f(\alpha, \beta) h_a(x - \alpha, y - \beta), \quad (1)$$

where $h_a(x,y)$ indicates a generic filter expressed in the spatial domain; $\circledast$ indicates a circular convolution operator. In the frequency domain, a filtering may be expressed based on a 2D convolution theorem by a following expression (2):

$$f(x,y) \circledast h_a(x,y) \Leftrightarrow F(u,v) H_a(u,v), \quad (2)$$

where $F(u,v)=DFT(f(x,y))$ and $H_a(u,v)=DFT(h_a(x,y))$.

Since the Fourier spectrum include comb-shaped diversions diverging radially from the center of the Fourier spectrum in the predetermined orientation substantially perpendicular to the orientation of the rod-shaped particles in the spatial domain image, rod-shaped particles with a specific orientation may be filtered using an appropriately-designed filter. In accordance with one embodiment of the present disclosure, instead of an ideal/notch filter, a Gaussian/notch pass filter may be employed.

In order to design the Gaussian/notch pass filter, first, a Gaussian high pass filter may be implemented. In the frequency domain, a frequency-distance based Gaussian high pass filter may be expressed by a following equation (3):

$$H_{gh}(u, v) = 1 - e^{-\frac{D^2(u,v)}{2D_0^2}}, \quad (3)$$

where $D(u,v)$ indicate a frequency distance from a frequency center (0 Hz); D0 indicates a cutoff frequency. FIG. 4, at (a), and FIG. 4, at (b), show a form and a 3 dimensional structure of the filter respectively. In this connection, the cutoff frequency may have 10% size of the zero-padded image (fp).

In order to allow the Gaussian high pass filter to have a direction, a product between a rectangular filter ($rect^i$) and the $H_{gh}(u,v)$ may be realized. The rectangular filter may consist of 0 and 1. Thus, the product between a rectangular filter ($rect^i$) and the $H_{gh}(u,v)$ may allow a non-necessary portion to be removed. In FIG. 4, (c-1), (c-2) and (c-3) indicate respective rectangular filters having a 27 pixel thickness and oriented by 30, 90, 135° angles from a horizontal line respectively. In FIG. 4, (d-1), (d-2) and (d-3) indicate respective Gaussian/notch pass filters resulting from the products between the rectangular filters as indicated by FIG. 4, at (c-1), (c-2) and (c-3) and the $H_{gh}(u,v)$ respectively. In FIG. 4, (e-1), (e-2) and (e-3) indicate respective 3-dimensional structures of the Gaussian/notch pass filters as indicated by FIG. 4, at (d-1), (d-2) and (d-3). In this connection, i indicates a sequence of the Gaussian/notch pass filters and rectangular filters. In this connection, total 36 Gaussian/notch pass filters which may have a 5° angular spacing therebetween in a counter-clock wise direction may be employed in the present method.

An overall filtering process may be as follows:

1) Design a Gaussian/notch pass filter: $H^i_P$ (FIG. 3, at (d));
2) Apply the Gaussian/notch pass filter to the Fourier spectrum: $G^i_P = F_P H^i_P$ (FIG. 3, at (e));
3) Perform IDFT (inverse discrete Fourier transform): $g^i_P = IDFT(G^i_P)$ (FIG. 3, at (f));
4) Image division $g^i_P$ and adjustment of a size thereof to a minimal size: $g^i$ (FIG. 3, at (g)); and
5) Extract connected components (CCs): $r^i = g^i$ AND f (FIG. 3, at (h)).

In this connection, at the image division $g^i_P$ and the size adjustment, an imaginary part of $g^i_P$ may be ignored and 0 may be assigned to a negative value thereof, and, then, an Otsu method may be applied for the image division. When extracting the connected components, the connected components (CCs) may be removed when having pixels below δ pixels, to improve a computing speed. For example, in the spatial domain image in FIG. 3, each of the rod-shaped particles may have a thickness having about 3 to 4 pixels. In this case, δ may be 150. It should be noted that this rule may depend on a length and thickness of each of the rod-shaped particles. The connected components (CCs) extracted using an i-th filter may be indicated by a white color in (f-1), (f-2) and (f-3) in FIG. 4.

Validity and Numerical Experiment

Hereinafter, the validity of the present method for analyzing the rod-shaped particles may be checked using obtained images.

Figure 5:
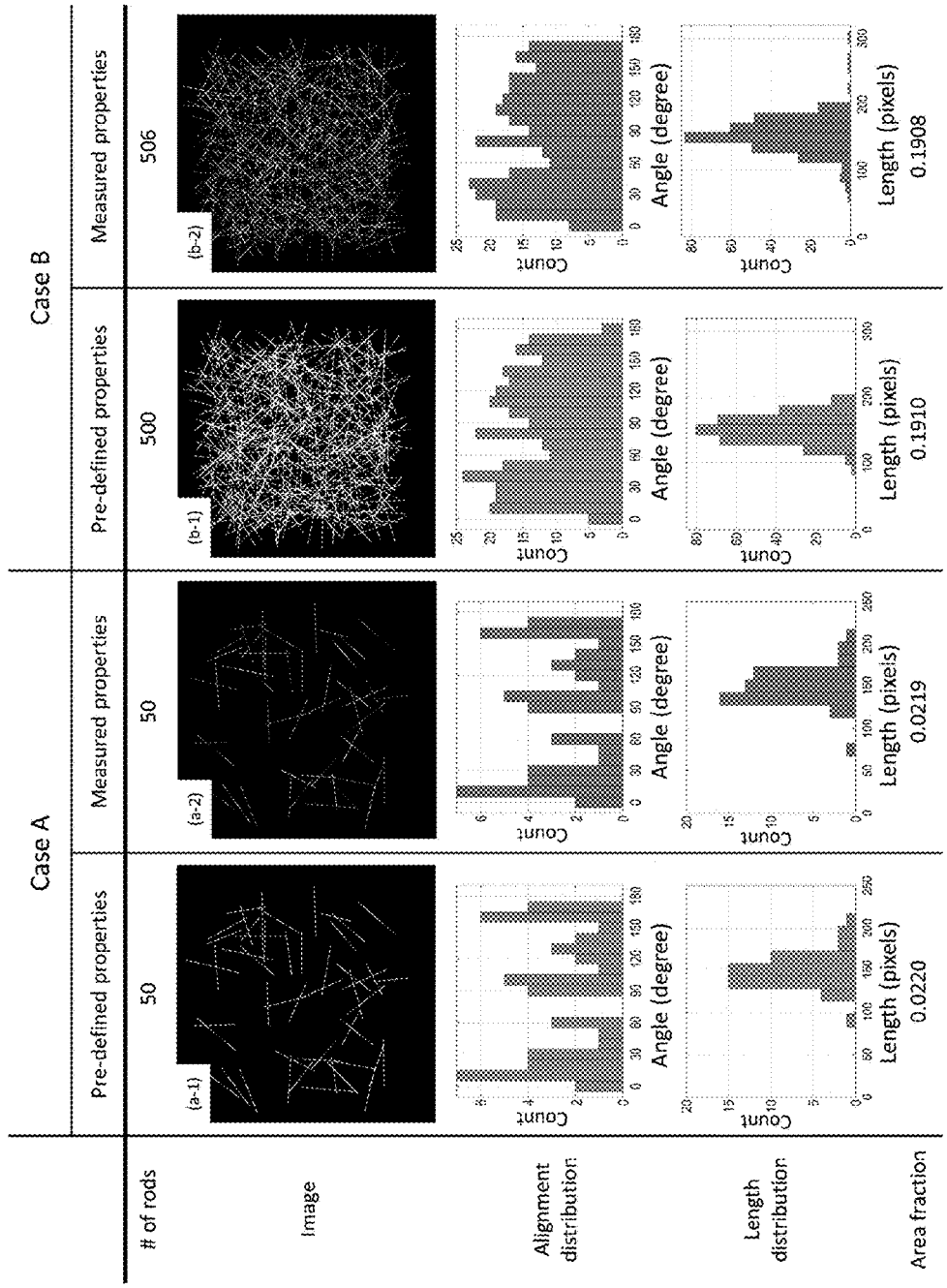
FIG. 5 illustrates images to prove validity of a method for analyzing rod-shaped particles in accordance with the present disclosure.

An image (600 by 600 pixels) having properties already known using the present method may be employed. In FIG. 5, (a-1) shows an image of 50 rod-shaped particles with random orientations and a normal distribution of 150±20 pixels. The pre-defined properties (alignment distribution, length distribution, area fraction) thereof are shown in FIG. 5. The thickness of each of the rod-shaped particles may be determined using a 2×2 morphological dilation mask. In FIG. 5, (b-1) shows an image of 500 rod-shaped particles with random orientations and a normal distribution of 150±20 pixels. The pre-defined properties (alignment distribution, length distribution, area fraction) thereof are shown in FIG. 5. The Gaussian/notch pass filter (L) has a thickness of 23 pixels, which may be determined based on the thickness of each of the rod-shaped particles. In accordance with the present disclosure, a p by p sized square dilation mask may be employed. In one example, when a 2×2 sized dilation mask is employed, each of the thickness of the rectangular filter (Rect$^i$) and, hence, the thickness of the Gaussian/notch pass filter (H$^i_P$) has 23 pixels. Beside this, a 8µ+3 rule may be applied.

In FIG. 5, (a-2) and (b-2) indicates measured properties of the rod-shaped particles when the present method is applied to the rod-shaped particles as indicated by FIG. 5 at (a-1) and the rod-shaped particles as indicated by FIG. 5 at (b-1) respectively. In this connection, different colors are used to distinguish between detected rod-shaped particles. The measured properties as shown in FIG. 5 confirms that the present method for analyzing the rod-shaped particles is valid, more specifically, that the present method is effective in finding out individual rod-shaped particles. Further, the present method is effective in finding out individual rod-shaped particles which cross each other at many points.

It may be seen from FIG. 5 that, when a smaller number of rod-shaped particles as in Case A are analyzed, the present method may substantially exactly find out a number of the rod-shaped particles, an orientation distribution, an length distribution, and an area fraction thereof. It may be also seen from FIG. 5 that, when a larger number of rod-shaped particles as in Case B are analyzed, the present method may substantially exactly find out a number of the rod-shaped particles, an orientation distribution, an length distribution, and an area fraction thereof, especially, an orientation distribution and area fraction thereof.

The computing rate of the algorithm of the method in accordance with one embodiment of the present disclosure may have 8.59 seconds for the case A and 40.71 seconds for the case B using a computer (Intel® Core™ i7-2600 Processor (3.40 GHz) and 16 GB RAM, Windows 7®).

Comparison Between Ideal/Notch Pass Filter and Gaussian/Notch Pass Filter

Figure 6:
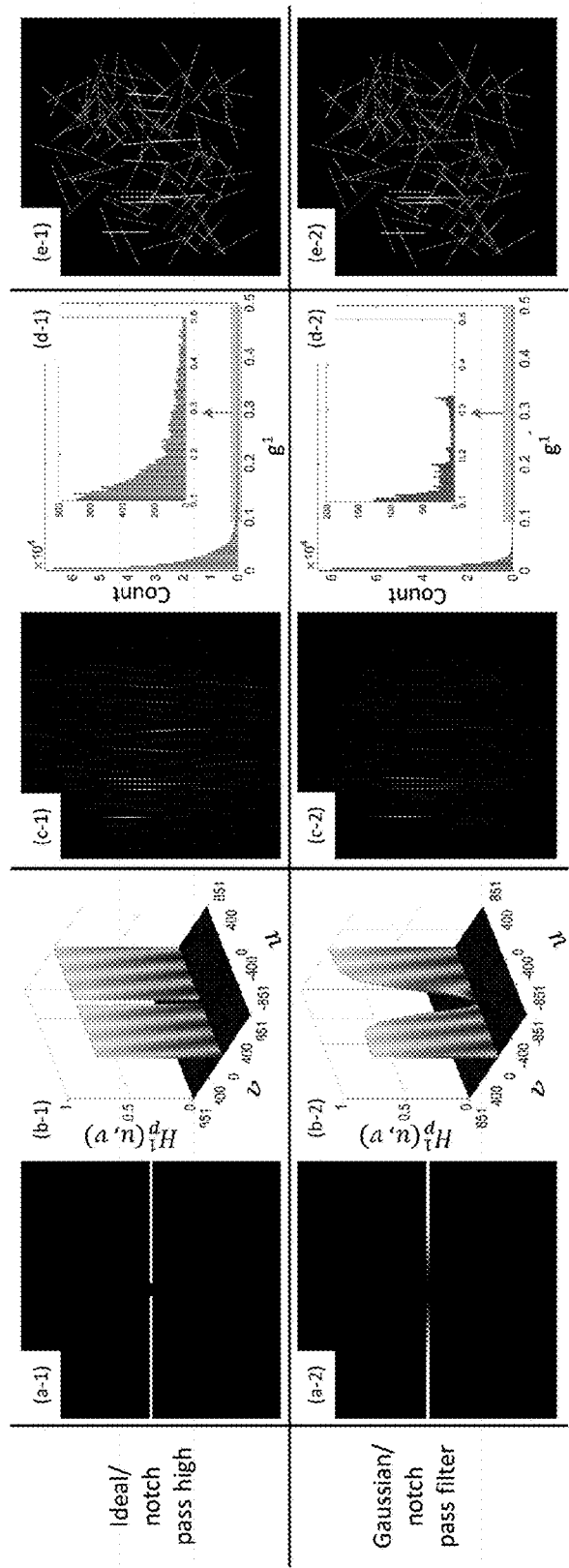
FIG. 6 illustrates comparison examples between the ideal/notch pass filter and Gaussian/notch pass filter.

FIG. 6 illustrates comparison examples between the ideal/notch pass filter and Gaussian/notch pass filter. In FIG. 6, (a-1) and (a-2) indicate forms of the ideal/notch pass filter and Gaussian/notch pass filter having the same cutoff frequency in the frequency domain respectively. In FIG. 6, (b-1) and (b-2) indicate cross-sections of the ideal/notch pass filter and Gaussian/notch pass filter respectively. In FIG. 6, (c-1) and (c-2) indicate filtered images by the ideal/notch pass filter and Gaussian/notch pass filter respectively. In FIG. 6, (d-1) and (d-2) indicate brightness histograms of filtered images by the ideal/notch pass filter and Gaussian/notch pass filter respectively. In FIG. 6, (e-1) and (e-2) indicate rod-shaped particles found out using the present algorithm employing the ideal/notch pass filter and Gaussian/notch pass filter respectively. A purple color may indicate an original spatial domain image. In the cross-sections as shown in FIG. 6, at (b-1), the ideal/notch pass filter may take a form of a box filter. When the ideal/notch pass filter is subjected to the inverse discrete Fourier transform, a "sinc function" may be achieved.

The filtered image exhibits ringing due to convolution between the sinc function and the same. This may because a side band of the sinc function vibrates and thus affect adjacent pixels thereto. This may be seen from FIG. 6, at (c-1), where the detected rod-shape particle has a thick line. Further, as shown in FIG. 6, at (d-1), this may cause the brightness histogram to be enlarged. Thus, the threshold value found out using the Otsu method may have a relatively larger value. This may cause the detection of a non-necessary pixels. As a result, this may lead to detection not only of the rod-shaped particles in a desired orientation but also of the rod-shaped particles in an orientation slightly deviated from the desired orientation. To be specific, as shown in FIG. 6, at (e-1), this may lead to detection not only of the rod-shaped particles in a target orientation perpendicular to that in the original spatial image, but also of the rod-shaped particles in an orientation slightly deviated from the target orientation. The detection of the rod-shaped particles in an orientation slightly deviated from the target orientation may cause the computing rate to be deteriorated. Further, a bundle of a false rod-shaped particles which are not present in the original spatial domain image may appear.

To the contrary, using the Gaussian/notch pass filter, the filtered image does not exhibit the ringing. This may be seen from FIG. 6, at (c-2), where the detected rod-shape particle has a non-thick line. Further, as shown in FIG. 6, at (d-2), this may not cause the brightness histogram to be enlarged. Thus, the threshold value found out using the Otsu method may not have a relatively larger value. This may not cause the detection of a non-necessary pixels. Thus, the computing rate may be improved. Further, a bundle of a false rod-shaped particles which are not present in the original spatial domain image may not appear. These all are because the IDFT (inverse discrete Fourier transform) of the Gaussian filter also is of the Gaussian filter, and, thus, smoothness is achieved unlike the sinc function. As a result, as seen from FIG. 6, at (d-2), the brightness histogram has a relatively narrow size. Thus, as seen from FIG. 6, at (e-2), the Otsu method may detect only the rod-shaped particles in a target orientation perpendicular to that in the original spatial image.

Relationship Between Cutoff Frequency and Rod-Shaped Particle Thickness

When interpreting an image in a frequency domain, a low frequency may indicate components with smaller changes, and, thus, express an overall silhouette in the image, while a high frequency may indicate components with larger changes, and, thus, express details in the image. That is, the image may be expressed as a combination between the silhouette expressed by the low frequency and the details expressed by the high frequency. The present disclosure aims at detecting, via a filtering, only the rod-shaped particles in a target orientation, that is, the orientation perpendicular to that in the original spatial image. Although the filter is designed to have the target orientation, the components expressed by the low frequency are relatively major, and, thus, not only the rod-shaped particles in a target orientation are detected, but also the silhouette of an overall original spatial domain image appears. This may deteriorate analysis resolution. Thus, the components expressed by the low frequency should be removed to some extent in designing the filter. In this connection, the applicant has conceived the Gaussian filter. As for the Gaussian filter, the removal extent of the components expressed by the low frequency may be based on the cutoff frequency.

Based on a numerical experiment, an optimal cutoff frequency may depend on a thickness of an object. When the thickness is smaller, the cutoff frequency should be larger. When the thickness is larger, the cutoff frequency should be smaller. This may lead to an effective analysis. This is because, when the thickness is larger, the silhouette including some of the thickness is required.

Based on a numerical experiment, when a thickness of each of rod-shaped particles in an image at 0.5 merging ratio is 2 to 3 pixels, a cutoff frequency having a size of 10% of the image size may be desired for good resolution. When a thickness of each of rod-shaped particles in an image at 0.5 merging ratio is 3 to 4 pixels, a cutoff frequency having a size of 7% of the image size may be desired for good resolution. When a thickness of each of rod-shaped particles in an image at 0.5 merging ratio is larger than 4 pixels (for example, 8 pixels), a cutoff frequency having a size of 3% of the image size may be desired for good resolution.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

What is claimed is:

1. A method for analyzing an image of rod-shaped particles, the method comprising: transforming a spatial domain image of rod-shaped particles having random orientations to a frequency domain image thereof using DFT (discrete Fourier transform); extracting connected components from the frequency domain image using a frequency domain filter, wherein the connected components have a predetermined orientation; and back-transforming the frequency domain image having the extracted connected components to a spatial domain image thereof using IDFT (inverse discrete Fourier transform), wherein in the frequency domain image, a DC frequency (0 Hz) is located at a center of a Fourier spectrum, wherein the connected components correspond to comb-shaped diversions diverging radially from the center of the Fourier spectrum in the predetermined orientation, wherein the predetermined orientation is substantially perpendicular to an orientation of the rod-shaped particles in the spatial domain image.

2. The method of claim 1, wherein the frequency domain filter is configured to allow the comb-shaped diversions to be passed and to disallow the center of the Fourier spectrum and remaining portions of the frequency domain image to be passed, wherein the remaining portions exclude the comb-shaped diversion, wherein the frequency domain filter include a Gaussian/notch pass filter.

3. The method of claim 2, wherein a size of a cutoff frequency for filtering the center is 3% to 10% of a larger length among longitudinal and transverse lengths of the spatial domain image.

4. The method of claim 1, wherein the spatial domain image resulting from the back-transforming indicates only the rod-shaped particles having an orientation substantially perpendicular to the predetermined orientation, wherein the frequency domain filter has the predetermined orientation.

5. The method of claim 1, further comprising counting a number of the rod-shaped particles using the spatial domain image resulting from the back-transforming.

6. The method of claim 5, further comprising determining an orientation distribution of the rod-shaped particles based on the counted number of the rod-shaped particles.

7. The method of claim 1, further comprising determining lengths of the rod-shaped particles using the spatial domain image resulting from the back-transforming.

8. The method of claim 7, further comprising determining a length distribution or area fraction of the rod-shaped particles based on the determined lengths of the rod-shaped particles.

* * * * *